S. L. ALLEN.
CULTIVATOR AND SECTIONAL CULTIVATOR TEETH.
APPLICATION FILED OCT. 28, 1908.
997,943.
Patented July 18, 1911.
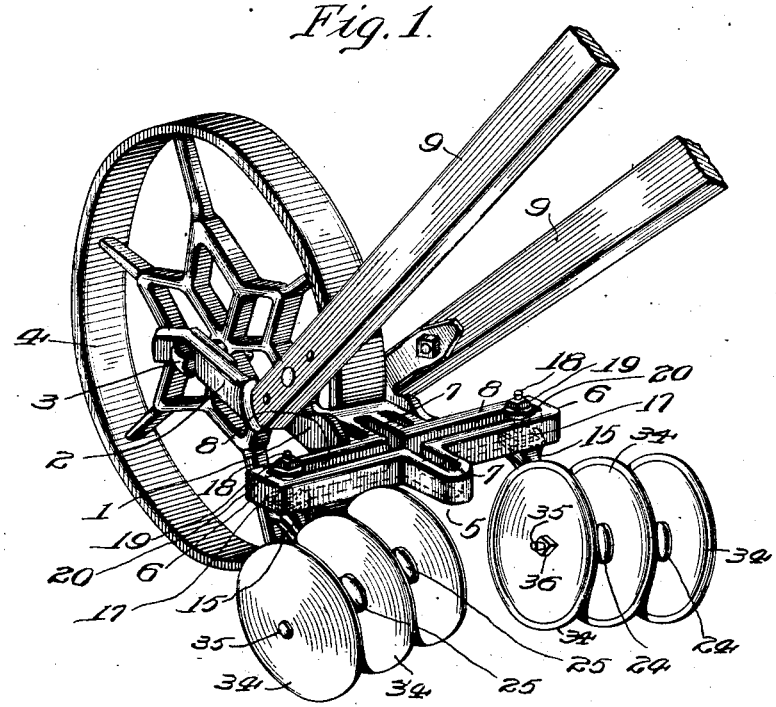
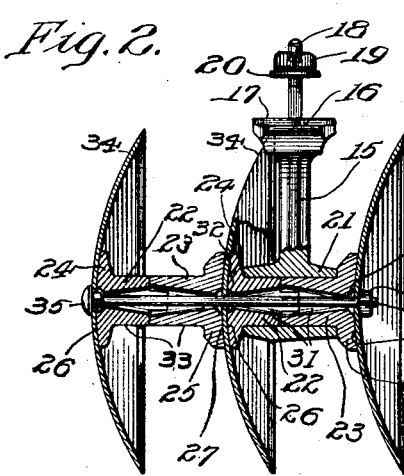
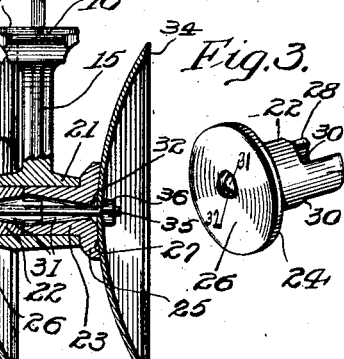
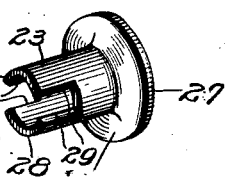
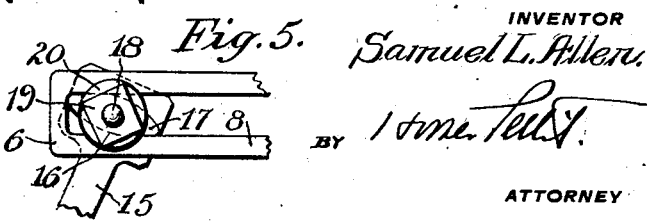
WITNESSES
INVENTOR
Samuel L. Allen.
BY
ATTORNEY

UNITED STATES PATENT OFFICE.

SAMUEL L. ALLEN, OF MOORESTOWN, NEW JERSEY.

CULTIVATOR AND SECTIONAL CULTIVATOR-TEETH.

997,943. Specification of Letters Patent. Patented July 18, 1911.

Application filed October 28, 1908. Serial No. 459,837.

*To all whom it may concern:*

Be it known that I, SAMUEL L. ALLEN, a citizen of the United States, and a resident of Moorestown, county of Burlington, State of New Jersey, have invented certain new and useful Improvements in Cultivators and Sectional Cultivator-Teeth, of which the following is a full, clear, and exact description, reference being had to the accompanying drawings, forming a part of this specification.

The main objects of this invention are to provide an improved cultivator, and to provide an improved sectional disk cultivator tooth or tool having a plurality of disk teeth detachably connected thereto which may be used either singly or in series.

In the accompaying drawings, Figure 1 is a perspective view of a cultivator showing one application of this invention; Fig. 2 a vertical sectional elevation through the axis of rotation of the disk teeth comprised by the sectional tool constructed in accordance with this invention; Figs. 3 and 4 are perspective views of details of the sectional tool; and Fig. 5 is a fragmentary top plan view of a portion of the cultivator and tool.

The drawings show this invention as applied in a single wheel cultivator of a well-known type comprising a frame 1 having a forwardly extending arm 2 rigid therewith, to which is secured the axle 3 upon which is rotatably mounted the carrier wheel 4. Projecting in the rear of the carrier wheel and forming part of the frame of the cultivator is the substantially horizontal bracket 5 having oppositely disposed lateral projections 6 integral therewith, and having a central, oblong longitudinal slot 7 intersected by a transverse oblong slot 8 extending through the lateral projections for adjustably holding cultivator teeth or other tools. The cultivator is provided with the usual handle bars 9 rigidly secured to the frame of the machine.

A pair of sectional teeth or tools are adjustably secured upon opposite sides respectively of the cultivator in the transverse slot 8 of the bracket 5. These tools are of identical construction in detail but are combined and arranged upon opposite sides of the cultivator respectively, to work upon opposite sides respectively of the row or rows to be cultivated. Each of these sectional tools comprises a shank 15 extending obliquely downwardly and rearwardly of the cultivator and is provided at its upper end with a horizontal shoulder 16, having a reduced upward extension 17 substantially diamond shape or rhombic in cross section. This extension is adjustably secured in the transverse slot 8 of the bracket by means of a bolt 18 projecting vertically and centrally from the extension, a nut 19 threaded upon the bolt, and the washer 20 between the nut and the bracket, the distance between the parallel sides of the extension being substantially equal to the width of the slot. By this construction the shank may be adjusted longitudinally of its slot or rotated to cause either pair of parallel sides of the diamond shaped extension to engage against the sides of the slot.

The lower end of the shank 15 is provided with a hollow cylindrical bearing 21 projecting laterally upon each side of the shank, the axis of this bearing being substantially perpendicular to the longitudinal axis of the shank and substantially parallel to the major axis of the diamond shaped projection 17 at the upper end of the shank.

Rotatively mounted in the opposite ends respectively of the bearing 21 are a pair of bushings 22 and 23 provided with enlarged outer ends 24 and 25, respectively, the end surfaces 26 and 27 of said ends being substantially spherical and respectively concave and convex. The inner end of one of the bushings is provided with longitudinal projections 28, having inwardly converging longitudinal edges 29, and the adjacent end of the other bushing is provided with corresponding recesses 30 whereby the two bushings are held against rotation with respect to each other. The bushings are each provided with an axial bore 31 tapering outwardly, the smaller end of the bore being flared slightly outwardly as at 32. One or more pairs of bushings 33, identical in construction with those already described are also provided, and each pair of bushings are adapted to be interposed between a pair of concentric concavo-convex disk cultivator teeth 34 of well known design, the teeth and bushings being then clamped together by means of a bolt 35 and nut 36, the teeth being thus uniformly spaced and held facing in the same direction. The pair of teeth upon the same side of the cylindrical bearing 21 of the tool are spaced apart by means of a pair of longitudinal separable bushings 33; but these two bushings 33 may obviously be made in a single piece if preferred, the divided form of bushings being used however between each pair of teeth for economy in construction and to avoid a multiplicity of patterns.

With this construction in mind it is evident that although the details of each one of the pair of sectional teeth or tools carried by the cultivator are identical in form, yet the details may be combined, as illustrated in Fig. 1, so that the shank 15 of each tool inclines downwardly, rearwardly and inwardly toward the central vertical longitudinal plane of the cultivator and each series of disk cultivator teeth face inwardly and revolve upon an axis parallel to the ground plane, the two axes converging forwardly and meeting in the central plane of the machine. It is also evident that one or more disk teeth may be used with each shank and the arrangement of the shanks and the teeth may be varied from that shown, to suit various conditions. The mode of operation of the cultivator is also apparent from the above description.

Having thus fully described my invention, what I claim and desire to protect by Letters Patent of the United States is,—

1. In a cultivator, the combination with a frame having a slot, of a shank having a flange engaging said frame, and a diamond-shaped projection adjustable in said slot, and a tool carried by said shank.

2. In a cultivator, the combination with a frame having a slot, a shank having a flange engaging said frame, and a diamond-shaped projection adjustable in said slot, and a plurality of rotatable disk teeth carried by said shank on an axis transverse thereto.

3. In a cultivator, the combination with a frame having a slot, of a shank provided with a flange having a polygonal projection adjustable rotatably in said slot, means engaging said flange with said frame arranged to secure said projection in rigid relation to said frame, and a tooth carried by said shank.

4. In a cultivator, the combination with a frame having a slot, of a shank provided with a flange having a polygonal projection adjustable rotatably in said slot and longitudinally thereof, means including a flange arranged to secure said projection in rigid relation with said frame, and a cultivator tooth carried by said shank.

5. In a cultivator, the combination with a frame having a slot; of a flanged shank having a rhombic projection adjustable rotatably while in said slot, and a tool carried by said shank.

6. In a cultivator, the combination with a frame having a slot; of a flanged shank having a rhombic projection adjustable in said slot, said projection forming a shoulder arranged to engage said frame; means including said shoulder arranged to secure said shank in adjusted position; and a tool carried by said shank.

7. In a cultivator, the combination with a frame having a slot, of a shank having a polygonal projection adjustable rotatably and longitudinally in said slot and provided with laterally extending flanges, and means including said flanges arranged to rigidly secure said shank to said frame in adjusted position.

In witness whereof I have hereunto set my hand this 27th day of October A. D. 1908.

SAMUEL L. ALLEN.

Witnesses:
 A. I. GARDNER,
 ALEXANDER PARK.

Copies of this patent may be obtained for five cents each, by addressing the "Commissioner of Patents, Washington, D. C."